Patented Aug. 11, 1936

2,050,789

UNITED STATES PATENT OFFICE 2,050,789

MANUFACTURE OF CONDENSATION PRODUCTS FROM ALIPHATIC ORGANIC COMPOUNDS

Otto Fuchs, Frankfort-on-the-Main, and Wilhelm Querfurth, Mainz-Mombach, Germany No Drawing. Application March 27, 1934, Serial No. 717,677. In Great Britain October 26, 1931

43 Claims. (Cl. 260—156)

This application is a continuation in part of our application Serial No. 639,734 filed October 26th, 1932.

The present invention relates to the manufacture of valuable condensation products from butyl-alcohols or mixtures thereof by catalytic treatment in the presence of hydrogen.

Insofar as the use of alcohols as initial material is concerned, it has already been proposed to convert such alcohols into higher alcohols and other valuable products by the use of a catalyst consisting of a metal oxide having a dehydrating effect such as alumina in conjunction with a metal such as copper or silver known to have a hydrogenating action.

In carrying out the manufacture according to the present invention we use catalysts which consist of a difficulty reducible oxide or mixture of oxides having only feeble or no basic action and being stable at the prevailing temperature and having a dehydrating action, together with a metal or mixture of metals known to have a hydrogenating or dehydrogenating action and not exceeding in quantity ten per cent by weight of the complete catalyst. The metal or metals may be taken in their metallic state and be admixed as such or the oxide or oxides may be used, it being understood that owing to the use of hydrogen as hereinbefore mentioned and as hereinafter described the oxide or oxides will rapidly be reduced. We may also use, as an addition in the catalyst, oxides having a basic reaction. However it may also be preferable to employ a catalyst containing larger amounts of the basic oxide. The catalyst may be used on carriers, such as pumice or other inert material.

According to the present invention it is essential that hydrogen should be added to the reaction mixture as it has been found that improved technical results are obtained by this addition; and, moreover, the addition of hydrogen increases the activity and the life of the catalyst. Suitable amounts of hydrogen are from one half mol. hydrogen to three or more mols. hydrogen for each mol. of aliphatic compound.

The conversion can be carried out at temperatures between 150 and 400° C. and atmospheric or increased pressure. In the latter case moderate pressures up to fifty atmospheres are advantageous.

As examples of the metal oxides of feeble basic action which can be used, may be mentioned alumina, uranium oxide, thoria, beryllium oxide and zirconium oxide and so forth, and as catalytic metals can be mentioned copper, nickel, silver, chromium, cadmium, zinc, tin, manganese and cobalt. Suitable oxides having a basic reaction are calcium oxide, barium oxide, strontium oxide, magnesia and lithia.

We have also found that by altering the proportions of metal oxide and catalytic metal in the catalyst, the course of the reaction can be influenced so that either higher yields of alcohols and the like can be produced, or the conversion can be directed towards the production of larger proportions of esters and so forth. It is essential, however, that the proportion of catalytic metal should not exceed ten per cent by weight of the total catalyst.

After the catalytic conversion the products of the reaction may be condensed and separated, or partially condensed and recirculated over the catalyst. The unconverted starting material may be recirculated over the catalyst alone or together with any of the products of the reaction.

In accordance with the present invention butyl alcohol and methyl or ethyl alcohol and hydrogen are subjected to the action of mixed catalysts as set forth above with the reaction temperature being between 150° and 400° C. while using atmospheric or moderately elevated pressure.

The following are examples of the manner in which the invention may be carried into effect and the results obtained.

Example I

The catalyst employed was contained in an electrically heated tube of any suitable material such as aluminium and was composed as follows:

| | |
|---|---|
| Magnesium oxide | 89 parts Mg by weight |
| Alumina | 8 parts Al by weight |
| Copper oxide | 3 parts Cu by weight |

The amount of basic oxide is relatively large because we are here treating a mixture of alcohols including a higher alcohol as hereinbefore mentioned. The mixture consisted of methyl alcohol, butyl alcohol and hydrogen in the proportion of 4, 6 mols. methyl alcohol, 2 mols. butyl alcohol, and 2 mols. hydrogen. This mixture was passed over the catalyst at a pressure of about 30 atmospheres and a temperature of about 350° C.

The condensation products obtained (in addition to unchanged components and small amounts of acetaldehyde, butyraldehyde and esters of formic acid) were as follows:—

|  | Parts by weight |
|---|---|
| Amyl alcohol | 1078 |
| Hexyl alcohol | 82 |
| Alcohols of higher boiling point especially heptyl alcohol | 480 |

This example shows that by using a mixture of alcohols including a higher alcohol together with methyl alcohol, the higher alcohols with a boiling point of over 120° C. can be obtained in considerable quantities. It is for example possible to take the mixed products resulting from any initial conversion of a lower alcohol into a higher alcohol and re-treat it according to the present invention for the further conversion into higher alcohols. Similarly it is possible to take the mixed product of any initial conversion of a lower alcohol into a higher alcohol or to take either component of such a product and to mix it with a fresh quantity of an alcohol and subject that mixture to treatment according to the present invention.

*Example II*

Using the same catalyst as in Example I a mixture of ethyl alcohol, butyl alcohol and hydrogen in the proportion of 1 mol. ethyl alcohol, 0.6 mols. butyl alcohol, and 1.5 mols. hydrogen was treated at 258° C. at atmospheric pressure.

The condensation products obtained were as follows:—

|  | Parts by weight |
|---|---|
| Hexyl alcohol (both normal hexyl alcohol and diethyl carbinol) | 50.5 |
| Octyl alcohol | 16.1 |
| Higher boiling point alcohols including decyl alcohol, and ethers of higher alcohols | 20.0 |

*Example III*

Using the same catalyst as in Examples I and II, but a temperature of 320° C. and a pressure of 30 atmospheres, the mixture treated was in the proportion of 3 mols. ethyl alcohol, 1, 8 mols. butyl alcohol, and 2 mols. hydrogen.

The condensation products obtained were as follows:—

|  | Parts by weight |
|---|---|
| Hexyl alcohol | 336 |
| Octyl alcohol | 47 |
| Higher boiling point alcohols including decyl alcohol and ethers of higher alcohols | 318 |

This example shows the advantage of using a moderate super-atmospheric pressure when treating mixed alcohols.

It is evident that this process does not merely involve a reaction between each molecule of butyl alcohol with each molecule of ethyl alcohol. Instead, all possible reactions are involved, and these proceed in accordance with the law of mass action. Thus, in spite of the presence of butyl alcohol, there will first be a combination of two molecules of ethyl alcohol, resulting first in the formation of butyl alcohol; the latter can again react with one molecule of ethyl alcohol, finally producing hexyl alcohol. This is evident from Example II, where the yield of hexyl alcohol is greater than was to be expected if only the butyl alcohol contributed to the formation of the hexyl alcohol.

We claim:

1. The process of producing valuable condensation products from butyl alcohol which comprises subjecting said butyl alcohol in conjunction with hydrogen to the action of a mixed catalyst comprising a compound taken from a group consisting of alumina, uranium oxide, thoria, beryllium oxide and zirconium oxide as the preponderant constituent in admixture with a substance taken from a group consisting of copper, nickel, silver, chromium, cadmium, zinc, tin, manganese and cobalt and the oxides thereof, said substance not exceeding in quantity 10% by weight of the complete catalyst and the reaction temperature ranging from about 150° C to about 450° C.

2. The process of producing valuable condensation products from butyl alcohol which comprises subjecting said butyl alcohol in conjunction with hydrogen to the action of a mixed catalyst comprising a compound taken from a group consisting of alumina, uranium oxide, thoria, beryllium oxide and zirconium oxide as the preponderant constituent in admixture with a mixture of substances taken from a group consisting of copper, nickel, silver, chromium, cadmium, zinc, tin, manganese and cobalt and the oxides thereof, said substances not exceeding in quantity 10% by weight of the complete catalyst and the reaction temperature ranging from about 150° C. to about 450° C.

3. The process of producing valuable condensation products from butyl alcohol which comprises subjecting said butyl alcohol in conjunction with hydrogen to the action of a mixed catalyst comprising a compound taken from a group consisting of alumina, uranium oxide, thoria, beryllium oxide and zirconium oxide as the preponderant constituent in admixture with a substance taken from a group consisting of copper, nickel, silver, chromium, cadmium, zinc, tin, manganese and cobalt and the oxides thereof, said substance not exceeding in quantity 10% by weight of the complete catalyst and the reaction temperature ranging from about 150° C. to about 450° C. under superatmospheric pressure.

4. The process of producing valuable condensation products from butyl alcohol which comprises subjecting said butyl alcohol in conjunction with hydrogen to the action of a mixed catalyst comprising a compound taken from a group consisting of alumina, uranium oxide, thoria, beryllium oxide and zirconium oxide as the preponderant constituent in admixture with a mixture of substances taken from a group consisting of copper, nickel, silver, chromium, cadmium, zinc, tin, manganese and cobalt and the oxides thereof, said substances not exceeding in quantity 10% by weight of the complete catalyst and the reaction temperature ranging from about 150° C. to about 450° C. under superatmospheric pressure.

5. The process of producing valuable condensation products from a mixture of methyl and butyl alcohols which comprises subjecting said mixture in conjunction with hydrogen to the action of a mixed catalyst comprising a compound taken from a group consisting of alumina, uranium oxide, thoria, beryllium oxide and zirconium oxide as the preponderant constituent in admixture with a substance taken from a group consisting of copper, nickel, silver, chromium, cadmium, zinc tin, manganese and cobalt and the oxides thereof, said susbtance not exceeding in quantity 10% by weight of the complete catalyst and the reaction temperature ranging from about 150° C. to about 450° C.

6. The process of producing valuable condensation products from a mixture of methyl and butyl alcohols which comprises subjecting said mixture in conjunction with hydrogen to the action of a mixed catalyst comprising a compound taken from a group consisting of alumina, uranium oxide, thoria, beryllium oxide and zirconium oxide as the preponderant constituent in admixture with a mixture of substances taken from a group consisting of copper, nickel, silver, chromium, cadmium, zinc, tin, manganese and cobalt and the oxides thereof, said substances not exceeding in quantity 10% by weight of the complete catalyst and the reaction temperature ranging from about 150° C. to about 450° C.

7. The process of producing valuable condensation products from a mixture of methyl and butyl alcohols which comprises subjecting said mixture in conjunction with hydrogen to the action of a mixed catalyst comprising a compound taken from a group consisting of alumina, uranium oxide, thoria, beryllium oxide and zirconium oxide as the preponderant constituent in admixture with a substance taken from a group consisting of copper, nickel, silver, chromium, cadmium, zinc, tin, manganese and cobalt and the oxides thereof, said substance not exceeding in quantity 10% by weight of the complete catalyst and the reaction temperature ranging from about 150° C. to about 450° C. under superatmospheric pressure.

8. The process of producing valuable condensation products from a mixture of methyl and butyl alcohols which comprises subjecting said mixture in conjunction with hydrogen to the action of a mixed catalyst comprising a compound taken from a group consisting of alumina, uranium oxide, thoria, beryllium oxide and zirconium oxide as the preponderant constituent in admixture with a mixture of substances taken from a group consisting of copper, nickel, silver, chromium, cadmium, zinc, tin, manganese and cobalt and the oxides thereof, said substances not exceeding in quantity 10% by weight of the complete catalyst and the reaction temperature ranging from about 150° C. to about 450° C. under superatmospheric pressure.

9. The process of producing valuable condensation products from a mixture of ethyl and butyl alcohols which comprises subjecting said mixture in-conjunction with hydrogen to the action of a mixed catalyst comprising a compound taken from a group consisting of alumina, uranium oxide, thoria, beryllium oxide and zirconium oxide as the preponderant constituent in admixture with a substance taken from a group consisting of copper, nickel, silver, chromium, cadmium, zinc, tin, manganese and cobalt and the oxides thereof, said substance not exceeding in quantity 10% by weight of the complete catalyst and the reaction temperature ranging from about 150° C. to about 450° C.

10. The process of producing valuable condensation products from a mixture of ethyl and butyl alcohols which comprises subjecting said mixture in conjunction with hydrogen to the action of a mixed catalyst comprising a compound taken from a group consisting of alumina, uranium oxide, thoria, beryllium oxide and zirconium oxide as the preponderant constituent in admixture with a mixture of substances taken from a group consisting of copper, nickel, silver, chromium, cadmium, zinc, tin, manganese and cobalt and the oxides thereof, said substances not exceeding in quantity 10% by weight of the complete catalyst and the reaction temperature ranging from about 150° C. to about 450° C.

11. The process of producing valuable condensation products from a mixture of ethyl and butyl alcohols which comprises subjecting said mixture in conjunction with hydrogen to the action of a mixed catalyst comprising a compound taken from a group consisting of alumina, uranium oxide, thoria, beryllium oxide and zirconium oxide as the preponderant constituent in admixture with a substance taken from a group consisting of copper, nickel, silver, chromium, cadmium, zinc, tin, manganese and cobalt and the oxides thereof, said substance not exceeding in quantity 10% by weight of the complete catalyst and the reaction temperature ranging from about 150° C. to about 450° C. under superatmospheric pressure.

12. The process of producing valuable condensation products from a mixture of ethyl and butyl alcohols which comprises subjecting said mixture in conjunction with hydrogen to the action of a mixed catalyst comprising a compound taken from a group consisting of alumina, uranium oxide, thoria, beryllium oxide and zirconium oxide as the preponderant constituent in admixture with a mixture of substances taken from a group consisting of copper, nickel, silver, chromium, cadmium, zinc, tin, manganese and cobalt and the oxides thereof, said substances not exceeding in quantity 10% by weight of the complete catalyst and the reaction temperature ranging from about 150° C. to about 450° C. under superatmospheric pressure.

13. The process of producing valuable condensation products from butyl alcohol which comprises subjecting said butyl alcohol in conjunction with hydrogen to the action of a mixed catalyst comprising essentially a compound taken from a group consisting of alumina, uranium oxide, thoria, beryllium oxide and zirconium oxide in admixture with a substance taken from a group consisting of copper, nickel, silver, chromium, cadmium, zinc, tin, manganese and cobalt and the oxide thereof, said substance not exceeding in quantity 10% by weight of the complete catalyst and in admixture with an agent taken from a group consisting of calcium oxide, barium oxide, strontium oxide, magnesia and lithia and the reaction temperature ranging from about 150° C. to about 450° C.

14. The process of producing valuable condensation products from butyl alcohol which comprises subjecting said butyl alcohol in conjunction with hydrogen to the action of a mixed catalyst comprising essentially a compound taken from a group consisting of alumina, uranium oxide, thoria, beryllium oxide and zirconium oxide in admixture with a mixture of substances taken from a group consisting of copper, nickel, silver, chromium, cadmium, zinc, tin, manganese and cobalt and the oxides thereof, said substances not exceeding in quantity 10% by weight of the complete catalyst and in admixture with an agent taken from a group consisting of calcium oxide, barium oxide, strontium oxide, magnesia and lithia and the reaction temperature ranging from about 150° C. to about 450° C.

15. The process of producing valuable condensation products from a mixture of methyl and butyl alcohols which comprises subjecting said mixture in conjunction with hydrogen to the action of a mixed catalyst comprising essentially a compound taken from a group consisting of alumina, uranium oxide, thoria, beryllium oxide and zirconium oxide in admixture with a substance taken from a group consisting of copper, nickel, silver, chromium, cadmium, zinc, tin, manganese and cobalt and the oxides thereof, said substance not exceeding in quantity 10% by weight of the complete catalyst and in admixture with an agent taken from a group consisting of calcium oxide, barium oxide, strontium oxide, magnesia and lithia and the reaction temperature ranging from about 150° to about 450° C.

16. The process of producing valuable condensation products from a mixture of methyl and butyl alcohols which comprises subjecting said mixture in conjunction with hydrogen to the action of a mixed catalyst comprising essentially a compound taken from a group consisting of alumina, uranium oxide, thoria, beryllium oxide and zirconium oxide in admixture with a mixture of substances taken from a group consisting of copper, nickel, silver, chromium, cadmium, zinc, tin, manganese and cobalt and the oxides thereof, said substances not exceeding in quantity 10% by weight of the complete catalyst and in admixture with an agent taken from a group consisting of calcium oxide, barium oxide, strontium oxide, magnesia and lithia and the reaction temperature ranging from about 150° C. to about 450° C.

17. The process of producing valuable condensation products from a mixture of ethyl and butyl alcohols which comprises subjecting said mixture in conjunction with hydrogen to the action of a mixed catalyst comprising essentially a compound taken from a group consisting of alumina, uranium oxide, thoria, beryllium oxide and zirconium oxide in admixture with a substance taken from a group consisting of copper, nickel, silver, chromium, cadmium, zinc, tin, manganese and cobalt and the oxides thereof, said substance not exceeding in quantity 10% by weight of the complete catalyst and in admixture with an agent taken from a group consisting of calcium oxide, barium oxide, strontium oxide, magnesia and lithia and the reaction temperature ranging from about 150° C. to about 450° C.

18. The process of producing valuable condensation products from a mixture of ethyl and butyl alcohols which comprises subjecting said mixture in conjunction with hydrogen to the action of a mixed catalyst comprising essentially a compound taken from a group consisting of alumina, uranium oxide, thoria, beryllium oxide and zirconium oxide in admixture with a mixture of substances taken from a group consisting of copper, nickel, silver, chromium, cadmium, zinc, tin, manganese and cobalt and the oxides thereof said substances not exceeding in quantity 10% by weight of the complete catalyst and in admixture with an agent taken from a group consisting of calcium oxide, barium oxide, strontium oxide, magnesia and lithia and the reaction temperature ranging from about 150° C. to about 450° C.

19. The process of producing valuable condensation products from butyl alcohol which comprises subjecting said butyl alcohol in conjunction with hydrogen to the action of a mixed catalyst comprising essentially a compound taken from a group consisting of alumina, uranium oxide, thoria, beryllium oxide and zirconium oxide in admixture with a substance taken from a group consisting of copper, nickel, silver, chromium, cadmium, zinc, tin, manganese and cobalt and the oxides thereof, said substance not exceeding in quantity 10% by weight of the complete catalyst and in admixture with magnesia and the reaction temperature ranging from about 150° C. to about 450° C.

20. The process of producing valuable condensation products from butyl alcohol which comprises subjecting said butyl alcohol in conjunction with hydrogen to the action of a mixed catalyst comprising essentially a compound taken from a group consisting of alumina, uranium oxide, thoria, beryllium oxide and zirconium oxide in admixture with a substance taken from a group consisting of copper, nickel, silver, chromium, cadmium, zinc, tin, manganese and cobalt and the oxides thereof, said substance not exceeding in quantity 10% by weight of the complete catalyst and in admixture with barium oxide and the reaction temperature ranging from about 150° C. to about 450° C.

21. The process of producing valuable condensation products from butyl alcohol which comprises subjecting said butyl alcohol in conjunction with hydrogen to the action of a mixed catalyst comprising essentially a compound taken from a group consisting of alumina, uranium oxide, thoria, beryllium oxide and zirconium oxide in admixture with a substance taken from a group consisting of copper, nickel, silver, chromium, cadmium, zinc, tin, manganese and cobalt and the oxides thereof, said substance not exceeding in quantity 10% by weight of the complete catalyst and in admixture with calcium oxide and the reaction temperature ranging from about 150° C. to about 450° C.

22. The process of producing valuable condensation products from a mixture of methyl and butyl alcohols which comprises subjecting said mixture in conjunction with hydrogen to the action of a mixed catalyst comprising essentially a compound taken from a group consisting of alumina, uranium oxide, thoria, beryllium oxide and zirconium oxide in admixture with a substance taken from a group consisting of copper, nickel, silver, chromium, cadmium, zinc, tin, manganese and cobalt and the oxides thereof, said substance not exceeding in quantity 10% by weight of the complete catalyst and in admixture with magnesia and the reaction temperature ranging from about 150° C. to about 450° C.

23. The process of producing valuable condensation products from a mixture of methyl and butyl alcohols which comprises subjecting said mixture in conjunction with hydrogen to the action of a mixed catalyst comprising essentially a compound taken from a group consisting of alumina, uranium oxide, thoria, beryllium oxide and zirconium oxide in admixture with a substance taken from a group consisting of copper, nickel, silver, chromium, cadmium, zinc, tin, manganese and cobalt and the oxides thereof, said substance not exceeding in quantity 10% by weight of the complete catalyst and in admixture with barium oxide and the reaction temperature ranging from about 150° C. to about 450° C.

24. The process of producing valuable condensation products from a mixture of methyl and butyl alcohols which comprises subjecting said mixture in conjunction with hydrogen to the action of a mixed catalyst comprising essentially a compound taken from a group consisting of alumina, uranium oxide, thoria, beryllium oxide and zirconium oxide in admixture with a substance taken from a group consisting of copper, nickel, silver, chromium, cadmium, zinc, tin, manganese and cobalt and the oxides thereof, said substance not exceeding in quantity 10% by weight of the complete catalyst and in admixture with calcium oxide and the reaction temperature ranging from about 150° C. to about 450° C.

25. The process of producing valuable condensation products from a mixture of ethyl and butyl alcohols which comprises subjecting said mixture in conjunction with hydrogen to the action of a mixed catalyst comprising essentially a compound taken from a group consisting of alumina, uranium oxide, thoria, beryllium oxide and zirconium oxide in admixture with a substance taken from a group consisting of copper, nickel, silver, chromium, cadmium, zinc, tin, manganese and cobalt and the oxides thereof, said substance not exceeding in quantity 10% by weight of the complete catalyst and in admixture with magnesia and the reaction temperature ranging from about 150° C. to about 450° C.

26. The process of producing valuable condensation products from a mixture of ethyl and butyl alcohols which comprises subjecting said mixture in conjunction with hydrogen to the action of a mixed catalyst comprising essentially a compound taken from a group consisting of alumina, uranium oxide, thoria, beryllium oxide and zirconium oxide in admixture with a substance taken from a group consisting of copper, nickel, silver, chromium, cadmium, zinc, tin, manganese and cobalt and the oxides thereof, said substance not exceeding in quantity 10% by weight of the complete catalyst and in admixture with barium oxide and the reaction temperature ranging from about 150° C. to about 450° C.

27. The process of producing valuable condensation products from a mixture of ethyl and butyl alcohols which comprises subjecting said mixture in conjunction with hydrogen to the action of a mixed catalyst comprising essentially a compound taken from a group consisting of alumina, uranium oxide, thoria, beryllium oxide and zirconium oxide in admixture with a substance taken from a group consisting of copper, nickel, silver, chromium, cadmium, zinc, tin, manganese and cobalt and the oxides thereof, said substance not exceeding in quantity 10% by weight of the complete catalyst and in admixture with calcium oxide and the reaction temperature ranging from about 150° C. to about 450° C.

28. The process of producing valuable condensation products from butyl alcohol which comprises subjecting said butyl alcohol in conjunction with hydrogen to the action of a mixed catalyst comprising a dehydrating difficultly reducible metal oxide which will be stable in the reaction as the preponderant constituent in admixture with a hydrogenating metal not exceeding in quantity 10% by weight of the complete catalyst, the reaction temperature ranging from about 150° C. to about 450° C.

29. The process of producing valuable condensation products from butyl alcohol which comprises subjecting said butyl alcohol in conjunction with hydrogen to the action of a mixed catalyst comprising a dehydrating difficultly reducible metal oxide which will be stable in the reaction as the preponderant constituent in admixture with a mixture of hydrogenating metals not exceeding in quantity 10% by weight of the complete catalyst, the reaction temperature ranging from about 150° C. to about 450° C.

30. The process of producing valuable condensation products from butyl alcohol which comprises subjecting said butyl alcohol in conjunction with hydrogen to the action of a mixed catalyst comprising a dehydrating difficultly reducible metal oxide which will be stable in the reaction as the preponderant constituent in admixture with a hydrogenating metal oxide not exceeding in quantity 10% by weight of the complete catalyst, the reaction temperature ranging from about 150° C. to about 450° C.

31. The process of producing valuable condensation products from a mixture of methyl and butyl alcohols which comprises subjecting said mixture in conjunction with hydrogen to the action of a mixed catalyst comprising a dehydrating difficultly reducible metal oxide which will be stable in the reaction as the preponderant constituent in admixture with a hydrogenating metal not exceeding in quantity 10% by weight of the complete catalyst, the reaction temperature ranging from about 150° C. to about 450° C.

32. The process of producing valuable condensation products from a mixture of methyl and butyl alcohols which comprises subjecting said mixture in conjunction with hydrogen to the action of a mixed catalyst comprising a dehydrating difficultly reducible metal oxide which will be stable in the reaction as the preponderant constituent in admixture with a mixture of hydrogenating metals not exceeding in quantity 10% by weight of the complete catalyst, the reaction temperature ranging from about 150° C to about 450° C.

33. The process of producing valuable condensation products from a mixture of methyl and butyl alcohols which comprises subjecting said mixture in conjunction with hydrogen to the action of a mixed catalyst comprising a dehydrating difficultly reducible metal oxide which will be stable in the reaction as the preponderant constituent in admixture with a hydrogenating metal oxide not exceeding in quantity 10% by weight of the complete catalyst, the reaction temperature ranging from about 150° C. to about 450° C.

34. The process of producing valuable condensation products from a mixture of ethyl and butyl alcohols which comprises subjecting said mixture in conjunction with hydrogen to the action of a mixed catalyst comprising a dehydrating difficultly reducible metal oxide which will be stable in the reaction as the preponderant constituent in admixture with a hydrogenating metal not exceeding in quantity 10% by weight of the complete catalyst, the reaction temperature ranging from about 150° C. to about 450° C.

35. The process of producing valuable condensation products from a mixture of ethyl and butyl alcohols which comprises subjecting said mixture in conjunction with hydrogen to the action of a mixed catalyst comprising a dehydrating difficultly reducible metal oxide which will be stable in the reaction as the preponderant constituent in admixture with a mixture of hydrogenating metals not exceeding in quantity 10% by weight of the complete catalyst, the reaction temperature ranging from about 150° C. to about 450° C.

36. The process of producing valuable condensation products from a mixture of ethyl and butyl alcohols which comprises subjecting said mixture in conjunction with hydrogen to the action of a mixed catalyst comprising a dehydrating difficultly reducible metal oxide which will be stable in the reaction as the preponderant constituent in admixture with a hydrogenating metal oxide not exceeding in quantity 10% by weight of the complete catalyst, the reaction temperature ranging from about 150° C. to about 450° C.

37. The process of producing valuable condensation products from a compound taken from a group consisting of butyl alcohol, a mixture of butyl alcohol and methyl alcohol and a mixture of butyl alcohol and ethyl alcohol which comprises subjecting said compound in conjunction with hydrogen to the action of a mixed catalyst comprising a compound taken from a group consisting of alumina, uranium oxide, thoria, beryllium oxide and zirconium oxide as the preponderant constituent in admixture with a substance taken from a group consisting of copper, nickel, silver, chromium, cadmium, zinc, tin, manganese and cobalt and the oxides thereof, said substance not exceeding in quantity 10% by weight of the complete catalyst and the reaction temperature ranging from about 150° C. to about 450° C.

38. The process of producing valuable condensation products from a compound taken from a group consisting of butyl alcohol, a mixture of butyl alcohol and methyl alcohol and a mixture of butyl alcohol and ethyl alcohol which comprises subjecting said compound in conjunction with hydrogen to the action of a mixed catalyst comprising a compound taken from a group consisting of alumina, uranium oxide, thoria, beryllium oxide and zirconium oxide as the preponderant constituent in admixture with a mixture of substances taken from a group consisting of copper, nickel, silver, chromium, cadmium, zinc, tin, manganese and cobalt and the oxides thereof, said substances not exceeding in quantity 10% by weight of the complete catalyst and the reaction temperature ranging from about 150° C. to about 450° C. under superatmospheric pressure.

39. The process of producing valuable condensation products from a compound taken from a group consisting of butyl alcohol, a mixture of butyl alcohol and methyl alcohol and a mixture of butyl alcohol and ethyl alcohol which comprises subjecting said compound in conjunction with hydrogen to the action of a mixed catalyst comprising a compound taken from a group consisting of alumina, uranium oxide, thoria, beryllium oxide and zirconium oxide as the preponderant constituent in admixture with a substance taken from a group consisting of copper, nickel, silver, chromium, cadmium, zinc, tin, manganese and cobalt and the oxides thereof, said substance not exceeding in quantity 10% by weight of the complete catalyst and the reaction temperature ranging from about 150° C. to about 450° C. under superatmospheric pressure.

40. The process of producing valuable condensation products from a compound taken from a group consisting of butyl alcohol, a mixture of butyl alcohol and methyl alcohol and a mixture of butyl alcohol and ethyl alcohol which comprises subjecting said compound in conjunction with hydrogen to the action of a mixed catalyst comprising a compound taken from a group consisting of alumina, uranium oxide, thoria, beryllium oxide and zirconium oxide as the preponderant constituent in admixture with a mixture of substances taken from a group consisting of copper, nickel, silver, chromium, cadmium, zinc, tin, manganese and cobalt and the oxides thereof, said substances not exceeding in quantity 10% by weight of the complete catalyst and the reaction temperature ranging from about 150° C. to about 450° C.

41. The process of producing valuable condensation products from a compound taken from a group consisting of butyl alcohol, a mixture of butyl alcohol and methyl alcohol and a mixture of butyl alcohol and ethyl alcohol which comprises subjecting said compound in conjunction with hydrogen to the action of a mixed catalyst comprising essentially a compound taken from a group consisting of alumina, uranium oxide, thoria, beryllium oxide and zirconium oxide in admixture with a substance taken from a group consisting of copper, nickel, silver, chromium, cadmium, zinc, tin, manganese and cobalt and the oxides thereof, said substance not exceeding in quantity 10% by weight of the complete catalyst and in admixture with an agent taken from a group consisting of calcium oxide, barium oxide, strontium oxide, magnesia and lithia and the reaction temperature ranging from about 150° C. to about 450° C.

42. The process of producing valuable condensation products from a compound taken from a group consisting of butyl alcohol, a mixture of butyl alcohol and methyl alcohol and a mixture of butyl alcohol and ethyl alcohol which comprises subjecting said compound in conjunction with hydrogen to the action of a mixed catalyst comprising essentially a compound taken from a group consisting of alumina, uranium oxide, thoria, beryllium oxide and zirconium oxide in admixture with a mixture of substances taken from a group consisting of copper, nickel, silver, chromium, cadmium, zinc, tin, manganese and cobalt and the oxides thereof, said substances not exceeding in quantity 10% by weight of the complete catalyst and in admixture with an agent taken from a group consisting of calcium oxide, barium oxide, strontium oxide, magnesia and lithia and the reaction temperature ranging from about 150° C. to about 450° C.

43. The process of producing valuable condensation products from a compound taken from a group consisting of butyl alcohol, a mixture of butyl alcohol and methyl alcohol and a mixture of butyl alcohol and ethyl alcohol which comprises subjecting said compound in conjunction with hydrogen to the action of a mixed catalyst comprising essentially a compound taken from a group consisting of alumina, uranium oxide, thoria, beryllium oxide and zirconium oxide in admixture with a substance taken from a group consisting of copper, nickel, silver, chromium, cadmium, zinc, tin, manganese and cobalt and the oxides thereof, said substance not exceeding in quantity 10% by weight of the complete catalyst and in admixture with magnesia and the reaction temperature ranging from about 150° C. to about 450° C.

OTTO FUCHS.
WILHELM QUERFURTH.